C. F. BLACK.
TROLLEY WHEEL.
APPLICATION FILED DEC. 18, 1907.

907,561.

Patented Dec. 22, 1908.

WITNESSES:
D. C. Walter
Ada E. Cameron

INVENTOR.
Charles F. Black,

UNITED STATES PATENT OFFICE.

CHARLES F. BLACK, OF TOLEDO, OHIO, ASSIGNOR TO THE TOLEDO BEARING COMPANY, OF TOLEDO, OHIO, A CORPORATION OF OHIO.

TROLLEY-WHEEL.

No. 907,561.　　　Specification of Letters Patent.　　　Patented Dec. 22, 1908.

Application filed December 18, 1907. Serial No. 406,971.

*To all whom it may concern:*

Be it known that I, CHARLES F. BLACK, a citizen of the United States, residing at Toledo, in the county of Lucas and State of Ohio, have invented certain new and useful Improvements in Trolley-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

A serious difficulty encountered in the operation and maintenance of electric trolley-lines arises from the rapid wear and deterioration of the trolley-wheels and their bearings. This is due largely to the high speed of the wheel, its necessarily small diameter, and its slight support and inadequate bearings together with the difficulty of preserving proper lubrication. It frequently happens that the trolley-wheel and its bearings must be renewed daily and often times two or three times in a day.

My invention relates to and its object is to provide means for overcoming the difficulties and objections here indicated; to provide bearings for a trolley-wheel which shall reduce friction to a minimum, and which shall preserve and prevent waste of the lubricant. I attain these objects by means of the devices and arrangement of parts hereinafter described and shown, and illustrated in the accompanying drawings, in which,—

Figure 1:
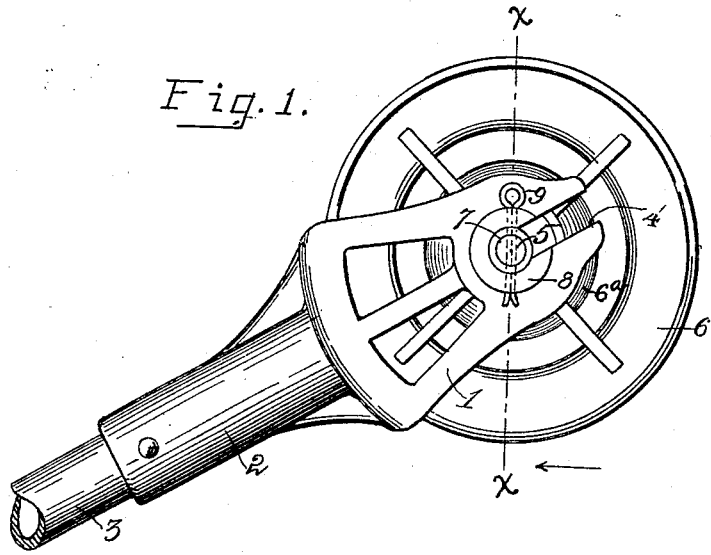
Figure 2:
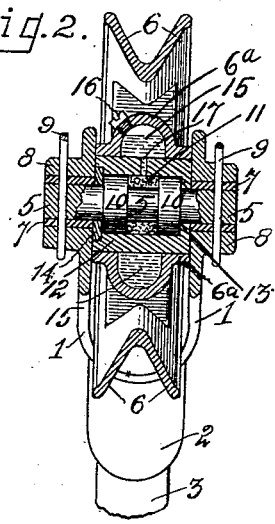

Figure 1 is a side-elevation of my device, and Fig. 2, a diametrical sectional elevation of the same, taken on line *x—x*, Fig. 1.

In the drawings, 1 is the trolley-fork or "harp" provided with a socket 2 for the reception of the upper end of the trolley-pole 3. The upper end of the fork or harp is slotted downwardly, as at 4, for the reception of the spindle 5 which forms a support and bearing for the peripherally grooved trolley-wheel 6. The bottom of each of the slots 4 is enlarged for the reception of a ring 7. The slot 4 enlarged at its bottom, together with the ring 7, form a convenient means for the assembling of the parts. At the points where the ends of the spindle 5 protrude, the fork or harp is provided with a boss 8 and through this boss and through the ring or sleeve 7 and the spindle 5, at each end, passes a split cotter-pin 9 which holds the spindle, the ring, and the harp in fixed relation.

Formed upon the spindle are two collars 10—10, between which collars and midway of the length of the spindle is an annular space 11 filled with some suitable absorbent,—such for instance as felt. 12 is a sleeve having a bore of just sufficient diameter to receive the collars 10, one end of the sleeve being closed and having a bore, as at 13, of reduced diameter just sufficient to permit the passage of one end of the spindle. The opposite end of the sleeve 12 has a counter-sunk recess in its end for the reception of a closely fitting disk 14 having a reduced opening for the passage of the other end of the spindle.

The hub 6ª of the trolley-wheel has a bore which receives the sleeve 12 with a fit so tight that the sleeve and the wheel must revolve together. The bore of the hub of the wheel is recessed circumferentially, as at 15, to form an annular chamber for holding the lubricating oil. The lubricant is supplied to the chamber 15 through a threaded opening which is closed by screw-plug 16. Through the sleeve 12 are one or more apertures 17 which connect the space 11 with the oil-chamber 15.

The device is assembled as follows: The sleeve 12 is pressed or driven into the bore of the hub of the trolley-wheel. The spindle 5, suitably wrapped with absorbent packing between its collars 10, is next slipped into the bore of the sleeve 12. The disk 14 is next driven or forced into its recess. The projecting ends of the spindle are slipped into the slots 4, the rings or sleeves 7 are slipped upon the ends of the spindle and into the annular spaces surrounding the same, and the cotter-pins are inserted in place. Now, the screw-plug 16 being removed, the annular oil-chamber is filled with lubricant, and the screw-plug is returned to place. It will be seen that now the absorbent packing in the space 11 receives oil from the oil-chamber through the slight apertures 17; that the joints surrounding the projecting spindle-ends are of such close fit that waste of the lubricant is obviated, and that the surface of the two enlarged collars 10—10 afford extended bearings for the interior of the sleeve 12.

Some of the advantages of this construction are that waste of the lubricant is prevented; that the packing keeps the bearings constantly and uniformly well lubricated; that a large supply of lubricant may be furnished which will last the wheel many days; that the enlarged diameter of the spindle within the sleeve furnishes greater stability for the trolley-wheel and affords a greater bearing and wearing surface than has hitherto been attainable in the use of a small spindle of uniform diameter throughout its length.

Having described my invention, what I claim and desire to secure by Letters Patent is, 1. In a device of the described character, a trolley wheel having a hub with an internal circumferential channel, a sleeve in the bore of and rigid with the wheel, said sleeve and said circumferential channel forming an annular oil-chamber, a spindle having thereon enlarged portions adapted to receive between them an absorbent packing and having their bearings in the bore of the sleeve, said sleeve having also an aperture leading from said annular chamber to the space between the enlarged portions upon the spindle, closures for the ends of the bore of the sleeve, said closures having therethrough reduced openings, a support, and means for rigidly securing the ends of the spindle in operative relation to the support.

2. In a device of the described character, a bifurcated wheel-support, a spindle having its extremities detachably secured against rotation in the opposed members of the support and having separated collars adapted to receive between them an absorbent packing, a sleeve having a bore adapted to receive said collars, closures for the ends of the sleeve, having therethrough openings for the passage of the ends of the spindle, a trolley-wheel mounted upon and revoluble with the sleeve and having in its hub an annular oil-space in communication with the space between said two collars.

3. In a device of the described character, a bifurcated wheel-support, a trolley-wheel having a hub with a circumferentially channeled bore, a sleeve rigidly secured in said bore, a spindle having enlarged bearings in such bore and having reduced ends detachably secured against rotation in the sides of the support, closures for the ends of the sleeve having openings for the reduced ends of the spindle, the circumferential channel having an aperture with a suitable closure,—for the reception of a lubricant,—and being in communication with the interior of the sleeve.

In testimony whereof I affix my signature in presence of two witnesses.

CHARLES F. BLACK.

Witnesses:
LOUIS H. PAINE,
ADA E. CAMERON.